United States Patent [19]

Chernack et al.

[11] Patent Number: 5,505,623
[45] Date of Patent: Apr. 9, 1996

[54] ANATOMICAL DISPLAY APPARATUS

[76] Inventors: Milton Chernack, 399 June Pl., West Hempstead, N.Y. 11552; Daniel Stool; Therese Santoro, both of R.R. 4, Box 7B, Windimere Ave., Greenwood Lake, N.Y. 10925

[21] Appl. No.: 180,422

[22] Filed: Jan. 12, 1994

[51] Int. Cl.$^6$ .................................................. G09B 23/28
[52] U.S. Cl. ..................... 434/272; 434/270; 434/402; 434/404
[58] Field of Search ..................... 434/272, 270, 434/267, 262, 366, 402, 404, 405

[56] References Cited

U.S. PATENT DOCUMENTS

| | | | |
|---|---|---|---|
| 2,472,114 | 6/1949 | Marder | 434/404 |
| 2,778,125 | 1/1957 | Hantman | 434/270 |
| 3,471,944 | 10/1969 | Breckwoldt | 434/270 |
| 3,624,942 | 12/1971 | Klohr | 434/270 X |
| 4,944,681 | 7/1990 | Burgio et al. | 434/267 X |

*Primary Examiner*—Gene Mancene
*Assistant Examiner*—Jeffrey A. Smith
*Attorney, Agent, or Firm*—Cohen, Pontani, Lieberman & Pavane

[57] ABSTRACT

An anatomical display apparatus includes a three-dimensional model simulating at least a portion of a human or animal body and within which is located a body part, region, tissue and/or organ of interest. A plurality of images of the body part, each showing the body part in a different state or condition such, for example, as before, during and/or after a therapeutic treatment, are carried on a movable support disposed within the model. The support is selectively movable under user manipulation or control so as to transport a selected one of the plural images into suitable juxtaposition with an opening or passageway defined in and through the model and thereby permit an observer located externally of the model to view the selected image within the model through the passageway. The images are disposed in the model, and the passageway is therein defined, so that each selected image is viewable by the observer in substantially that location in the model in which the body part of interest is correspondingly located in a living body.

8 Claims, 4 Drawing Sheets

1

ANATOMICAL DISPLAY APPARATUS

FIELD OF THE INVENTION

The present invention relates to an anatomical display apparatus used for exhibiting the effects of therapeutically treating a typically human patient's body part of interest. More particularly, the present invention relates to a three-dimensional model of a portion of a body which contains or encompasses the body part of interest for selectively displaying one or more first images depicting the body part prior to treatment and/or one or more second images depicting the body part in the course of and/or after the completion of treatment, the images being predeterminately located in the model so as to depict the body part at substantially the actual location of that body part within the body.

BACKGROUND OF THE INVENTION

As medical technology has become both more complex and costly to utilize, it has become increasingly desireable to have the ability to simply, economically and accurately demonstrate or exhibit to medical professionals such as physicians and surgeons and/or to lay people such as prospective or actual patients and their families the anticipated or intended effects of therapeutically treating a body part of interest. As used herein, the term body part is intended to denote that portion of a body—typically a human or other animal body and, most especially, an internal body part—that is being or is to or may be treated by a therapeutic procedure or regimen and should be understood as including tissue, bones and organs and the like. Thus, therapeutic treatments may include, without limitation, surgical procedures, radiation therapies, drug therapies, etc. It is particularly desirable to be able to clearly display for the user the subject body part as it appears both prior to treatment and after treatment, and perhaps during treatment, often as viewed by the medical professional. In other words, an apparatus utilized for such purposes should be capable of realistically exhibiting or depicting the body part as seen or observable by the medical professional during a pretreatment examination, during a course of treatment, and/or after treatment has been completed. For example, when treating the inner ear with medication, the physician will generally employ an otoscope to view the eardrum and/or other portions of the inner ear through the auditory canal; prior to such treatment one sees, through the otoscope, the unhealthy or diseased eardrum and, after treatment, the healthy eardrum. The patient, or potential patient, on the other hand, is generally limited to viewing textbook drawings or, perhaps, nonspecific photographs of the inner ear (or other body part of interest), and often finds it difficult to comprehend or appreciate from such drawings or photographs the true nature and/or severity of the condition and the need for and/or effects of a recommended treatment. It would be beneficial and desirable to be able to exhibit, as for the patient about to undergo or considering a particular treatment, the eardrum as viewed with an otoscope through the auditory canal before, during and after the treatment, thereby providing the patient with an accurate and realistic sense of the basis for the recommendation and the intended effects of the treatment. Moreover, for certain treatments the effects exhibit themselves in various discrete stages; it would also be helpful to be able to permit the patient to view the changing appearance of the subject body part at these intermediate stages of treatment.

An apparatus constructed for providing this advantageous functionality and abilities may be utilized in numerous ways for a wide range of applications. It may, for example, be employed in the education of medical professionals—i.e. as a study aid for assisting the professional or trainee to better visualize the effects of the intended or recommended treatment on the body part of interest, particularly in the natural setting or location of the body part. Such an apparatus may also be utilized by medical product sales personnel in their sales presentations to better demonstrate the effects of their products or treatment regimens. In yet another application, such an apparatus may be employed by medical professionals to explain planned or recommended treatments to patients and their families, the intent being to educate and to reduce pretreatment patient anxiety. Other equally beneficial uses will readily suggest themselves to those involved, even peripherally, with the education of medical professionals, with the treatment of patients, and with the design, development, testing, manufacture and sales—indeed, with virtually any aspect—of medical devices and drugs and the like.

Although there have been prior efforts to provide such desireable and clearly advantageous functionality using a variety of devices and arrangements, known efforts have often been unintuitively simple, or unacceptably expensive to produce or widely distribute, complex to manufacture and too heavy and unwieldy for convenient transport to various locations for use.

Anatomical display systems as heretofore employed to depict diseased body parts as they appear before and as a result of treatment have generally been limited to the use of simple drawings or photographs of the subject body part both before and after treatment, of video recordings where possible or appropriate, or of fixed three-dimensional models. Each of these prior art approaches has various disadvantages. For example, while it is intended that such drawings or photographs accurately depict the body part of interest, they often do not provide a realistic representation of the manner in which the medical professional views the body part in actual practic. Referring once more to the example of a physician viewing the eardrum with an otoscope, a photograph of the eardrum does not provide the sense or realism of a physician utilizing an otoscope nor would adjacent or peripheral regions or tissues or structures of the inner and outer ears be viewable in the photograph while providing sufficient detail of the eardrum. Video recordings suffer from similar disadvantages and are, in addition, difficult, expensive and time consuming to prepare. Furthermore, video playback equipment—such as a video tape player and associated television monitor—are expensive, take up significant amounts of valuable and often unavailable space and are generally far too large and heavy for convenient transport from place-to-place. As such, video recordings do not lend themselves to practical use by, for example, a salesperson for demonstrating a medical product at customer locations.

A fixed three-dimensional anatomical model may be capable of demonstrating the body part of interest as it exists in a single state or condition, but cannot be employed to selectively demonstrate the body part in a variety of conditions such as prior to and after the treatment. Although a multiplicity of such three-dimensional models may be provided to overcome this deficiency, each designed and constructed to demonstrate the body part of interest at a particular phase of treatment, this approach requires one to design, construct and transport a plurality of such models at generally unacceptable cost, space requirements and inconvenience. Moreover, such models cannot, once constructed to demonstrate a particular condition or treatment, be readily adapted for use in demonstrating the effects of a variety of different treatments.

OBJECTS OF THE INVENTION

The principal object of the present invention is therefore to provide an anatomical display apparatus that overcomes the aforementioned disadvantages of the prior art.

It is a particular object of the invention to provide an anatomical display apparatus for selectively displaying a plurality of images of a body part depicted in various states or conditions relative to a predetermined treatment or treatment regimen.

It is a further object of the present invention to provide an anatomical display apparatus which can selectively depict the effects of a treatment in various discrete stages of the treatment.

It is another object of the invention to provide such an anatomical display apparatus which depicts the body part of interest, in various states or conditions, proximate its normal location within a simulated model of at least that portion of a human or animal body within which the body part is actually located.

It is an additional object of the present invention to provide an anatomical display apparatus which is relatively compact, inexpensive to manufacture and easily transportable.

SUMMARY OF THE INVENTION

According to one aspect of the present invention, an anatomical display apparatus is provided with a three-dimensional model of at least a portion of a human body which includes an internal body part, region, tissue and/or organ of interest. The apparatus is operable, generally through manual manipulation or other control of the user, for selectively displaying one of a plurality of images depicting the body part in a corresponding plurality of states or conditions relating to a particular disorder or medical problem and/or as and/or after the body part is subjected to a particular treatment for the disorder or problem. These images may, for example, take the form of one or a plurality of images depicting the body part in a first condition and one or a plurality of images depicting the body part in a second condition. Preferably, under such circumstances, the first viewable image or image set is one or more images of the body part shown prior to any therapeutic treatment and the second viewable image or image set is one or more images of the body part shown after such treatment. An orifice or opening or cutaway is provided in the three-dimensional model extending from the model's exterior or outer periphery to its interior proximate the internal location of the subject body part to permit a user located externally of the model to selectively view the images which are located (or otherwise depict the body part as being) within the interior portion of the model. This arrangement thus provides an apparatus by which a viewer, looking at the body-simulating model, may peer through the opening into the interior of the model to view a body part in its proper location within the model and, moreover, to observe the body part in a plurality of states or conditions directly corresponding to the way that the body part appears or will appear prior to therapeutic treatment, at various stages during the course of treatment, and/or after the treatment has been completed. An anatomical display apparatus so constructed in accordance with the present invention may be advantageously utilized for educating medical professionals, for explaining medical conditions and therapeutic treatments for such conditions to patients and their families, and by sales personnel demonstrating their medical products.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE DRAWINGS

In the drawings, wherein like reference characters denote similar elements throughout the several views.

DETAILED DESCRIPTION OF THE PREFERRED EMBODIMENTS

Figure 1:
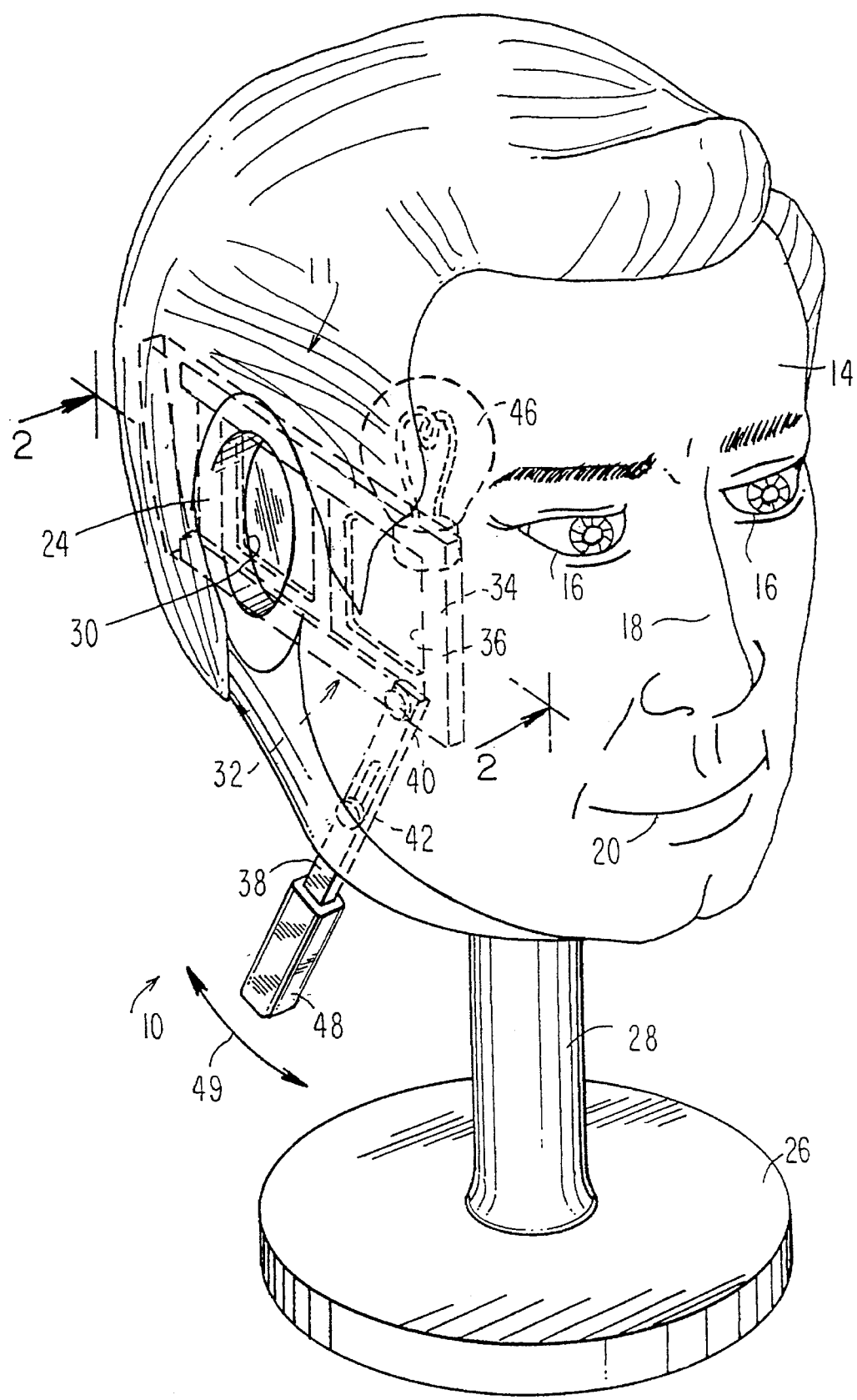
FIG. 1 is an elevated perspective view of an anatomical display device constructed in accordance with the teachings of the present invention.

FIG. 1 depicts a first embodiment of an anatomical display apparatus 10 constructed in accordance with the teachings of the present invention. In this particular embodiment, by way of example and primarily for convenience of description, the body part of interest—i.e. the body part that the apparatus 10 is intended to depict or simulate in various conditions or states or stages of treatment—is the inner ear 11 and, more specifically, the eardrum. It should nevertheless be recognized and understood that it is fully contemplated that the inventive apparatus may be configured and utilized for demonstrating or showing or simulating other body parts and portions of interest and that the formation or shaping of the illustrated embodiment 10 to simulate a human head, and the inclusion of structure and/or images depicting or simulating an inner ear and/or eardrum of that head, is by way of example only and should not be construed as a limitation on the scope of the invention. Indeed, the present invention may also be applied to simulated three-dimensional models of non-human or animal bodies, and to the depiction of body parts (in a plurality of states or conditions) of such non-human bodies. Thus references herein to a body, or to an animal body, although generally intended to denote a human body, should also be understood as including, within the scope and contemplation of the invention, the body or body parts of a nonhuman animal body.

In the FIG. 1 embodiment herein disclosed, the anatomical display apparatus 10 is configured in the form of a three-dimensional model 14 that simulates a human head. The head or model 14 may be fabricated, for example, of a molded plastic and includes, to enhance the simulation, suitably located eyes 16, a nose 18, a mouth 20, a left ear (not visible in the drawings) and a right ear 24. As so constructed, the three-dimensional model 14 is fixedly or otherwise mounted to a base 26, as by an upstanding pole or rod 28 or other appropriate support arrangement, for permitting the model 14 to rest securely atop a substantially flat or other supporting surface (not shown) and to provide an advantageous elevation from that surface for ease of use and observation as will hereinafter be described.

With continued reference to FIG. 1, the right ear 24 includes an associated auditory canal 30 defined in the simulation as a passageway extending from the exterior or outer periphery to the interior of the head 14 and which, in the apparatus 10, functions as a port or orifice or passageway for observer viewing of the eardrum and/or other portions of the inner ear 11. Thus, in this disclosed form of the invention the simulated auditory canal 30—a structural feature present in the human body and through which a medical professional will normally gain viewing access to the eardrum—provides a natural passageway or opening that may also function, in utilizing the invention in a preferred manner, as the opening through which a user of the invention may view the simulated eardrum and inner ear 11. Those skilled in the art will recognize and appreciate that when a different body part of interest not normally accessible through a naturally-present orifice is to be viewed in an apparatus constructed in accordance with the present invention, the body-simulating model of the invention may instead include another appropriate passageway or opening such, by way of example, as a simulated incision to serve as a user-employable viewing port for the body part of interest.

Figure 2:
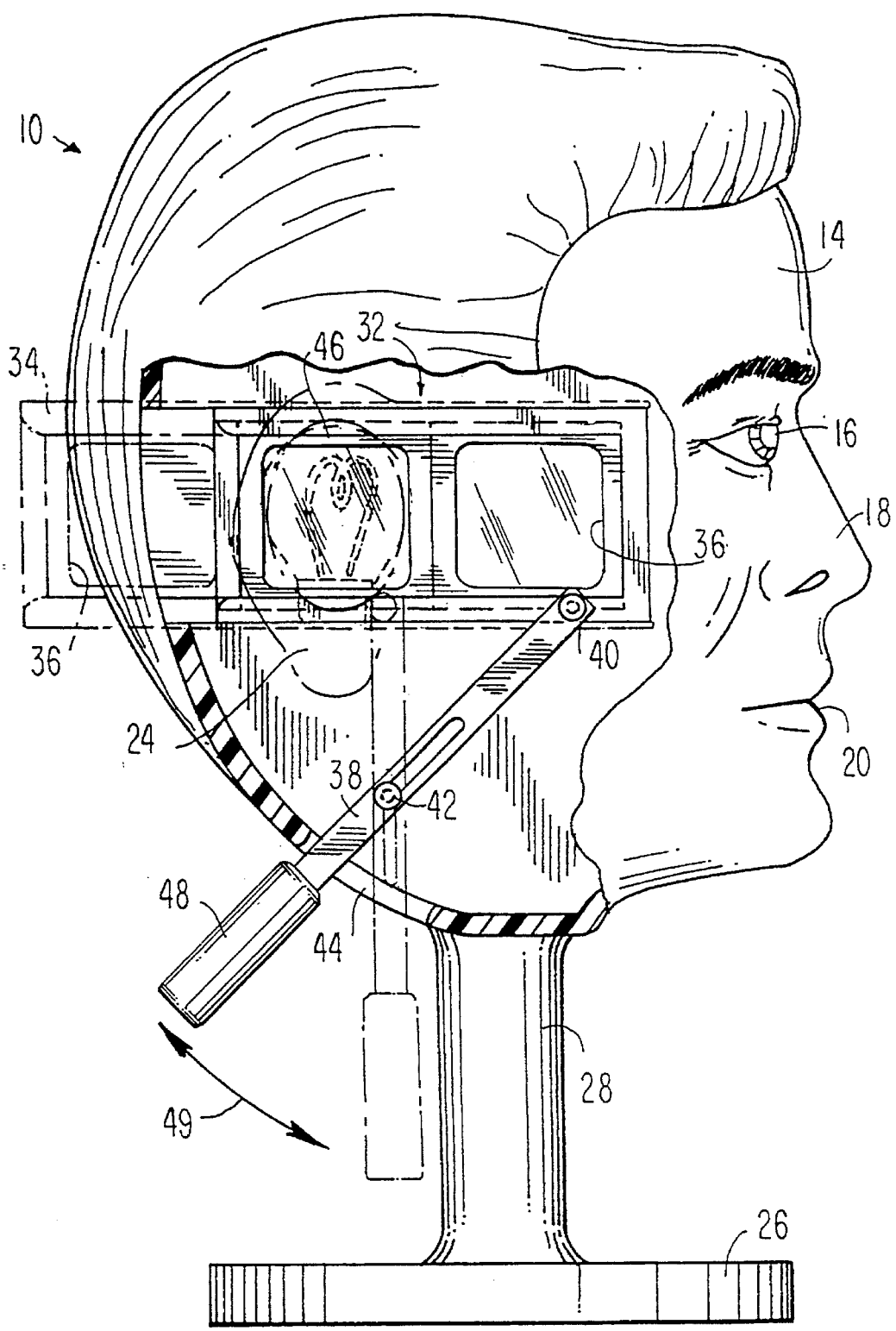
FIG. 2 is a cross-sectional view taken along the lines 2—2 in FIG. 1.

Turning now to the interior or cross-sectional view of FIG. 2, disposed within the interior of the head 14 of the anatomical display apparatus 10 is a support 32 for carrying a plurality of viewable images of the eardrum and/or inner ear 11. In this first embodiment of the invention, the support 32 is implemented in the form of a rectangularly-elongated slide 34 defined by a frame configured with a plurality of centrally-open areas 36 for carrying a positive-image photographic print or film transparency in each such area. The slide 34 shown in FIGS. 1 and 2 has, by way of example, three such open areas 36 for carrying three such image-bearing prints or films or transparencies. For this purpose, the slide 34 may incorporate lips or projections for retaining, by way of example, suitably-sized prints and/or standard mounted 35 mm photographic film transparencies or slides or the like. It is generally contemplated and intended that, in accordance with the invention, each print or film or transparency carried on the slide contains an image of the body part of interest—i.e. the eardrum and/or other portions of the inner ear 11 in this particular embodiment—and, moreover, that each print or transparency shows the eardrum in a different state or condition. For example, the first of the three images carried on the slide 34 may depict the eardrum in a diseased condition requiring treatment, the second may depict the eardrum at some intermediate point of improvement after a particular treatment or treatment regimen has commenced, and the third image may show the eardrum in a healthy condition after successful completion of the treatment. Other suitable image-bearing structures or means may also be utilized in lieu of, and/or in addition to, the use of photographic film positive-image prints or transparencies, as should be apparent and as a general matter of design choice.

The slide 34 is arranged in the model head 14 for selective, user-controlled longitudinal, linearly reciprocating movement so as to carry, one at a time, each of the held or retained prints or transparencies into juxtaposition or alignment with the auditory canal or passageway 30. Toward that end, the slide 34 may be supported within the model head 14 by discrete upper and lower rails (not shown) along which the slide 34 is moveable, or by rail-like supports or ledges unitarily defined in or from the material of which the head 14 is fabricated, or in any other manner suitable for providing the intended and required longitudinal linear movability of the slide 34. In any event, bidirectional linear movement of the slide is selectively effected by the user through manual manipulation of an adjustment lever 38 that is pivotally-secured to the slide at 40 and to the head at 42, and that projects outwardly from the model head interior through a slot 44 defined in the head for ready access by the user.

As described hereinbelow, it is generally contemplated and intended that a user of the inventive apparatus will most preferably view the interiorly-disposed images in a manner closely simulating the procedures by which a physician or other medical professional would view the actual body part of interest in a patient's body. Where that body part is the eardrum and/or other portions of the inner ear—as in each of the embodiments of the invention herein disclosed and, by way of example, described—the physician typically examines such structures using an otoscope, a hand-held viewing device having a cone-shaped portion for partial insertion into the auditory canal and through which an illumination source of the otoscope projects a beam of light to permit ready viewing of the inner ear. By viewing the simulated inner ear 11 of the three-diminsional model head 14 of the present invention through an otoscope inserted into the simulated auditory canal 30, the images carried on the slide 34 are illuminated by the otoscope-provided light and no supplemental or additional illumination source is required in the most preferred forms of the inventive apparatus.

Nevertheless, there may arise situations in which the user of the inventive apparatus 10, such as a patient or prospective patient, will be unable to view the simulated inner ear or other body part of interest through an otoscope or other medical instrument normally used by an examining physician. In other cases, it may prove necessary or desireable to provide the images to be viewed in the form of positive photographic film transparencies—which may be better or more easily examined when lit from behind the image—in lieu of front-lit photographic prints. To facilitate the use of such transparencies and the like, the apparatus 10 may optionally further incorporate or include an incandescent lamp 46 or other source of illumination located within the head in alignment with the auditory canal passageway 30 so that the slide 34 extends and is linearly moveable between the passageway 30 and the lamp 46. When the lamp 46 is illuminated, the slide-retained transparency that is aligned with the passageway 30 is illuminated by the lamp 46 and the image on that transparency may be viewed through the passageway by an observer located externally of the model head 14. It should of course be recognized and understood that the source of electrical potential for powering the lamp 46, the use of wires or other manner of supplying such potential to the lamp, and the provision of a switch or other device for enabling selective activation of the lamp, are all matters of design choice and their implementation is considered to be well within the abilities of the person of ordinary skill. Moreover, other devices or elements for providing illumination to the images carried by the support 32 may optionally be employed in lieu of an incandescent or other bulb-type lamp.

In use, the embodiment of the invention illustrated in FIGS. 1 and 2 is placed on a tabletop or other surface upon which the base 26 may conveniently rest. It is generally intended that the apparatus 10 be utilized to provide a patient or other observer with the ability to view the body part of interest, in a plurality of different states or conditions, in much the manner that the physician or medical professional will typically view or observe that body part when conducting an examination of a patient's body; this heightens the sense, for the patient or other observer, of how the body part actually appears in its true environment, of how the physician sees the body part, and of how the body part is to be treated, and thus provides an enhanced understanding and appreciation of the condition to be treated, of the manner of treatment, and of the intended effects of the treatment.

Accordingly, the lever 38 is initially pivotally manipulated, as by grasping its outwardly-projecting end or handle 48, so as to appropriately shift the slide 34 and thereby position the first image (e.g. of the diseased ear 11 that requires treatment) in alignment with the auditory canal 30. Where a lamp 46 or the like is incorporated within the model head 14, the first image will be positioned between the auditory canal and the lamp. The patient or observer may then peer into the auditory canal and view the image of the diseased inner ear 11. In a preferred use of the invention, the patient looks into the auditory canal through an otoscope—i.e. through the same instrument that the physician uses to examine and view the patient's actual inner ear—that has been inserted into the canal 30, thereby further heightening the observer's sense of realism. The lever 38 may then be selectively manipulated, as indicated by the arrow 49 in FIGS. 1 and 2, to pivot the handle and thereby align the next image (e.g. of the inner ear as it appears at an intermediate point after treatment has begun) with the auditory canal 30 so that the observer may thereby view that next image. Finally, the results of the treatment may be seen by viewing, still through the otoscope, the third and last image which has been moved through pivotal manipulation of the lever 38, and consequent linear transposition of the slide 34, into alignment with the auditory canal.

Numerous modifications of and additions to the apparatus 10 shown in FIGS. 1 and 2 and described hereinabove should now be apparent. For example, the slide 34, and/or its supporting elements within the model head 14, may be configured or provided with suitable structure for providing operative click-stops or other discernable indications or reports as each slide-carried transparency or image is transportedly positioned in observer-viewable alignment with the auditory canal. Moreover, the slide 34 may be configured for carrying only two images (rather than the three shown) of the body part of interest, or for carrying more than three such images—each preferably representing or depicting a different or modified state or condition of the body part. The slide 34 may also be disposed for remotely-controlled or effected linear movement between the various slide-viewing positions by means of other than the manually-pivoted arrangement disclosed, as through the use of electrically-driven motors or gearings and the like. These and other changes to this first disclosed embodiment—and similar or corresponding modifications to the other embodiments hereinafter described—are to be understood as being within the fully intended scope and contemplation of the present invention.

Figure 3:
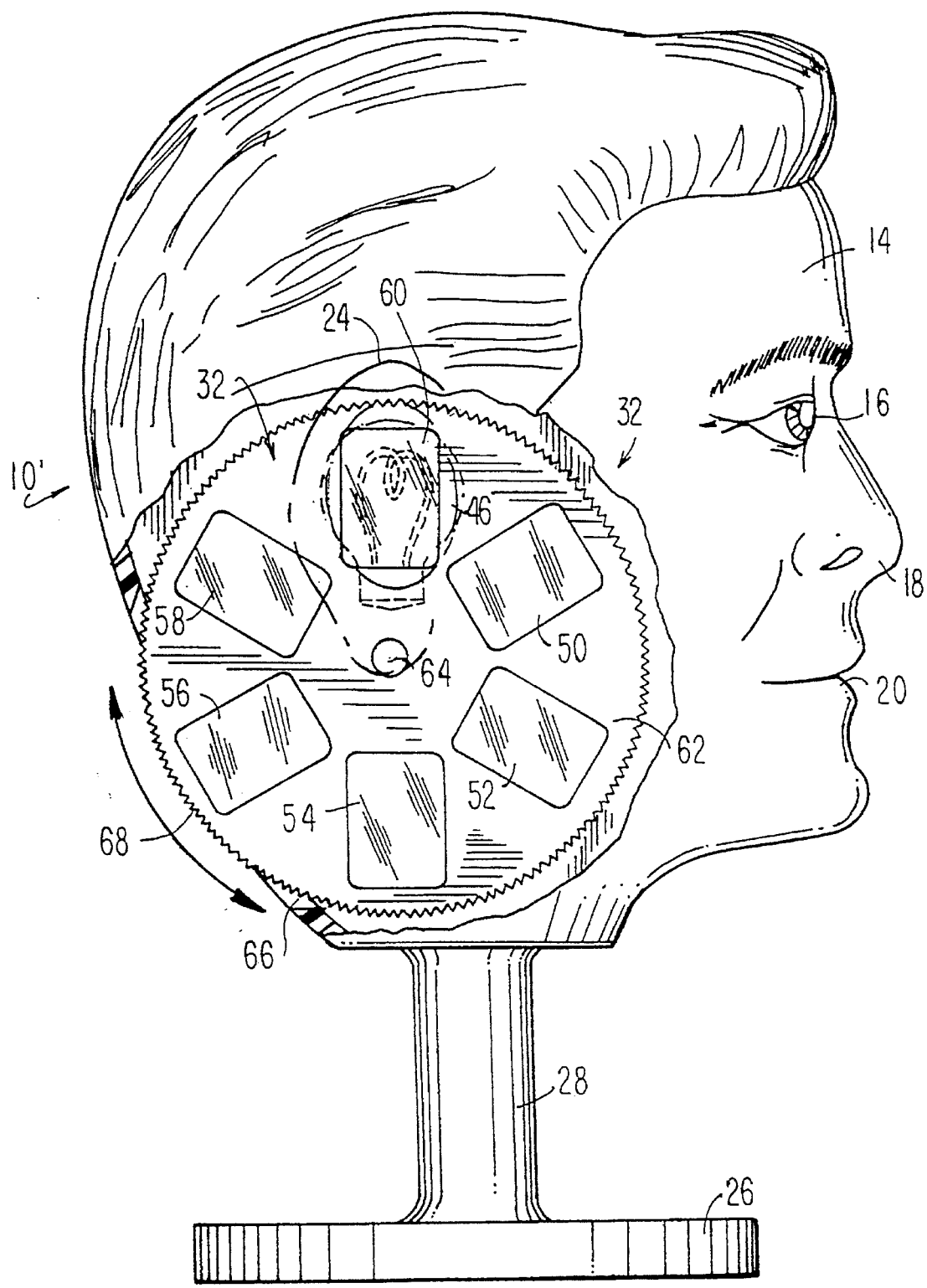
FIG. 3 is a cross-sectional view generally corresponding to FIG. 2 but illustrating an alternate embodiment of an anatomical display device constructed in accordance with the invention.

A second embodiment of an anatomical display apparatus is depicted in the cross-sectional view of FIG. 3. The main difference between the device or apparatus 10' of this second embodiment, and the apparatus 10 of FIGS. 1 and 2, is in the structure and manner of implementation of the viewable images support 32. The support 32 of FIG. 3 is especially configured, and is particularly appropriate, for carrying a relatively larger number of viewable images, such for example as the six images or image locations 50, 52, 54, 56, 58 and 60 therein shown, in a relatively confined space such as that present in the interior of the model head 14. More specifically, the support 32 of FIG. 3 is in the form of a substantially flat, circular disk 62 disposed primarily within the interior of the model head 14 and mounted for axial rotation on and about a fixed post 64. A limited circumferential portion of the disk periphery projects outwardly from the head 14 through a slot 66, and the peripheral edge of the disk 62 may be serrated or toothed—as shown at 68—so as to facilitate selective rotational manipulation of the disk through engagement of a user's finger with the outwardly-projecting edge portion of the disk. As in the embodiment of FIGS. 1 and 2, an illuminatable lamp 46 or other, functionally-equivalent source of light may optionally be disposed within the model head 14, aligned with the simulated auditory canal 30 such that a portion of the disk 62 is juxtaposed for rotation between the canal 30 and lamp 46. As should be apparent, the plural images 50 to 60 are carried about or proximate the circumferential periphery of the disk 62 so that, as the disk is selectively rotated about its supporting post 64, the images or image locations are aligned, one at a time, with the auditory canal 30 (and optional lamp 46) for viewing of the so aligned image through the canal 30 by an observer situated exteriorly of the model head 14. It is of course generally intended that each of the images carried at the various locations 50 to 60 of the disk 62 be of the same body part in a respectively different state or condition and, moreover, that each in turn depicts and represents a subsequent or modified condition of the body part from the pre-treatment diseased or unhealthy state to the post-treatment or cured or healthy state so that, as the disk 62 is selectively rotated in a single direction, the sequence of viewable images preferably depicts the changes in the body part as it progresses from its initially unhealthy condition to the healthy state expected or desired upon the completion of treatment.

The anticipated manner of use of this second embodiment of the anatomical display apparatus of the invention should now be evident. The observer views the body part of interest, in this case the eardrum of the inner ear 11, by inserting an otoscope through the simulated auditory canal 30 and sequentially or otherwise selectively viewing each of the images 50 to 62, manually turning the disk 62 to bring each image, in turn, into alignment with the auditory canal 30.

A particular advantage of this second or FIG. 3 embodiment over that first described hereinabove lies in the additional preferred ability to readily exchange the images-carrying disk 62 with another, like disk carrying different images. This arrangement permits, by way of example, a physician or teacher to discuss and exhibit to the patient or student the different results or mechanisms involved in the use of alternative therapies or treatments for a particular disorder, and/or to enable the viewing of a large number of images showing more details of the course of a treatment regimen than may otherwise be available utilizing only a single disk 62 of such images. In a teaching environment, different disks depicting the results of one or more treatments on actual patients encountered by the students may be interchangeably employed. Although such interchangeability may also be attained in the embodiment of FIGS. 1 and 2—as, for example, by inserting new transparencies into the slide frame 34—the limited number of slides effectively retainable at one time by such a slide construction, and the relatively time-consuming and labor-intensive nature of such substitutions, may in practice deter, rather than encourage, realization of the full scope of advantages attainable in accordance with the invention, and makes the FIG. 3 embodiment better suited for applications in which image-interchangeability is particularly desireable.

Figure 5:
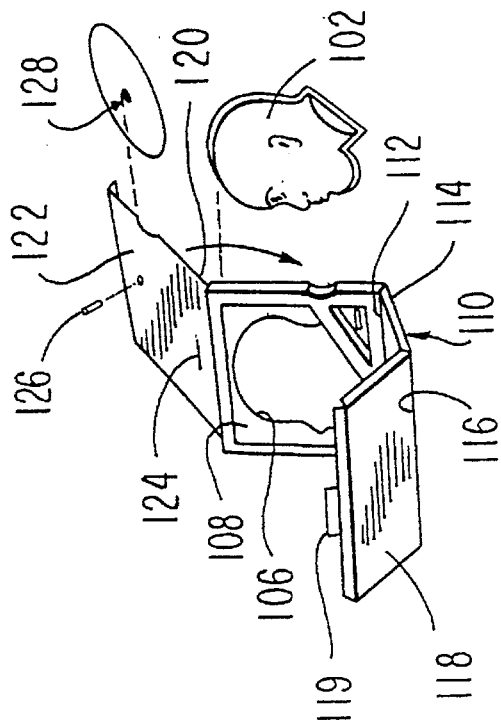
FIG. 5 is an exploded, elevated perspective view of the embodiment of FIG. 4 illustrating its construction and manner of assembly.
Figure 4:
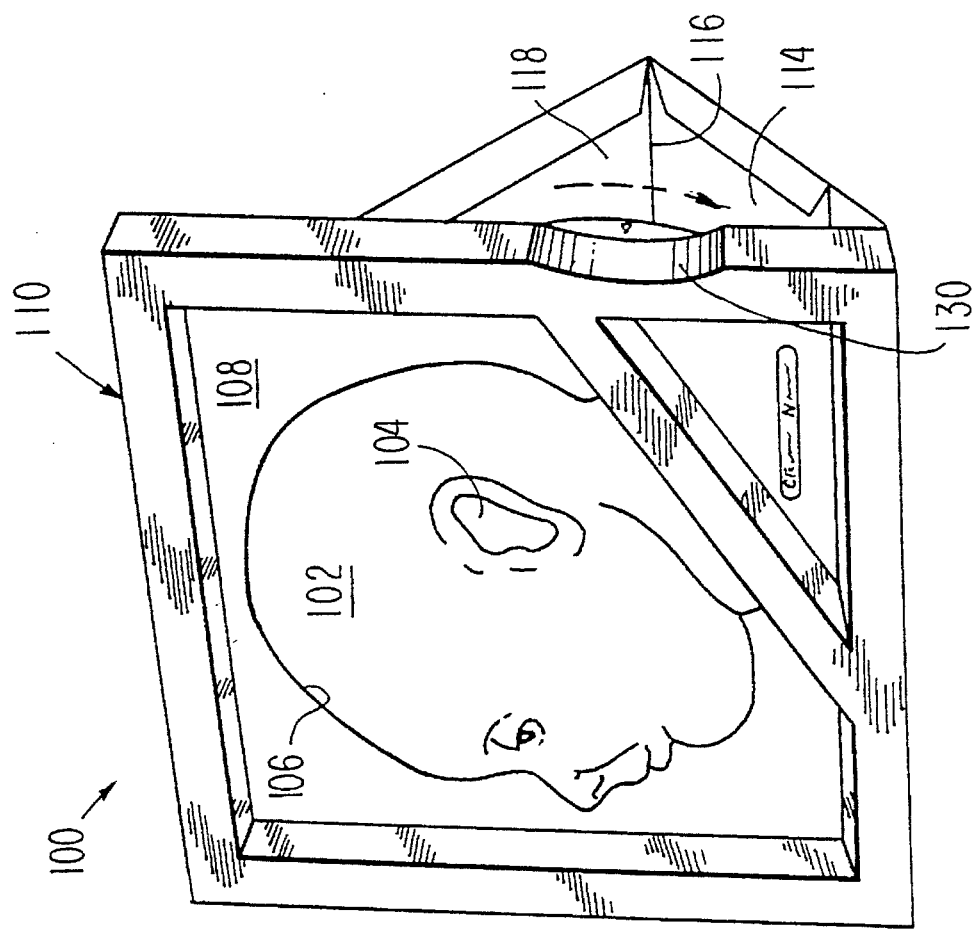
FIG. 4 is an elevated perspective view of still another embodiment of an anatomical display device constructed in accordance with the invention.

An additional embodiment of the present invention is depicted in FIGS. 4 and 5. This third embodiment affords, as will soon become apparent, particularly noteworthy advantages with respect to ease of portability, transportability and setup, is substantially self-standing and is relatively inexpensive to manufacture by virtue, at least in part, of its structural simplicity. The anatomical display apparatus 100 of FIGS. 4 and 5 is, once again by way of nonlimiting example, shown configured for use in simulating or depicting the stages and/or treatment of an inner ear condition and, as such, incorporates a three-dimensional model head 102. The head 102 may be vacuum-formed to define a topographically realistic shell including a passageway or channel 104 simulating the auditory canal. The head 102 is detachably or otherwise received in supported relation within a suitably-configured cutout or depression 106 that is provided in an inclined display face 108 of a self-standing frame 110.

The frame 110 is constructed, in a currently most preferred implementation of this third embodiment of the invention, as a substantially unitary, elongated member or blank forming a plurality of serially and longitudinally-adjacent panels that are joined one to another along intermediate fold lines or creases or the like. The blank may, by way of example, be fabricated of a heavy paper or cardboard, or of a molded thermoplastic or other suitable plastic, or of any other appropriate material as a general matter of design choice. It is also contemplated that the frame may alternatively be formed as a plurality of discrete members that are hinged or otherwise linked or joined along the so-called folds or creases hereinafter described. In any event, and with particular reference to FIG. 5 for the particular form of the apparatus 100 there depicted, the head-supporting display face or panel 108 is joined along a fold or crease 112 to a bottom-defining panel 114 that is, in turn, joined along a fold or crease 116 to a rear image panel 118. The panel 118 also carries a projecting tab 119 along its free edge opposite the fold 116. Along its end opposite the fold 112, the display face 108 is joined at a fold or crease 120 to a back-defining support panel 122. A slot 124, located and sized for engagedly and releasably receiving the tab 119 of the rear image panel 118, is defined in the back support panel 122. The panel 122 additionally receives, through an aperture or eyelet in the panel, a pivot pin or rivet or screw or post or other fulcrum-defining means 126 for supporting a multiple image-carrying disk 128 so as to render the disk 128 rotatable about the means 126 and relative to the panel 122 as will hereinafter be described. The means 126 may consist of any suitable structure for rotatably supporting the disk 128 as a general manner of design choice, and is preferably configured so as to permit the selective release and removal, for substitution or replacement, of the disk 128 without undue difficulty. The disk 128 carries a plurality of images related to one or more conditions of a body part of interest, as should by now be apparent, and may have the same general form and content—or any other as appropriate to provide the contemplated and intended functionality of the invention—as the disk 62 of the previously-described embodiment of FIG. 3.

To form or assemble or set up the anatomical display apparatus 100 for its intended use, the various panels of the preferably unitary blank are relatively folded or pivoted about the panel-separating creases or the like to define the self-standing frame 110. First, however, an images-carrying disk 128 is rotatably coupled by the pivot pin or means 126 to the rear image support panel 122 so that the disk is located on the underside of the visible face of the panel 122 in FIG. 5. The panel 122 is then folded about the crease 120, relative to and substantially against the display face 108, so as to place the disk-carrying face of the panel 122 in substantial abutment with or immediate adjacency to at least the radially-outward or peripheral portions of the back of the display face 108. With the panels 108, 122 in this overlaid condition, rotation of the disk 128 will serially bring each of the plural images carried or provided on the disk into alignment, one at a time, with the channel or passageway 104 that simulates the auditory canal and through which the images are individually viewable as, for example, through conventional use of an otoscope by a user of the apparatus 100. To facilitate user-controlled rotation of the disk 128 and the resulting selection of particular images for viewing through the passageway 104, the display face further incorporates an arcuate notch 130 along one of its transverse edges and through which a peripheral portion of the disk 128 projects outwardly beyond the notch 130 where it may be grasped by the user to initiate or perform disk rotations.

Next, the panel 114 is folded under the display face 108 to form the bottom of the apparatus 100 and upon which the apparatus rests atop a supporting surface, and the back support panel 118 is folded upwardly about the crease 116. The apparatus will now have the appearance of the fully assembled and configured unit 100 of FIG. 4, and may be so secured in position by inserting the tab 119 of the panel 118 engagedly into the slot 124 in the panel 122 to thereby complete the setup of this freestanding embodiment of the invention. The use of the apparatus 100 for permitting viewing of the subject body part in one or more states or conditions will now be apparent, as should the manner of partial disassembly for substituting a new disk 128 into rotatable engagement with the fulcrum means 126.

Thus, the present invention provides a unique teaching and demonstration device for permitting an observer to view images of a body part of interest, which body part is located within a human or animal body, in a plurality of states or conditions corresponding, as is generally anticipated and intended, to the appearance of the body part before, during and/or after a predetermined treatment or treatment regimen has been applied to the body part. The images of the body part are located or depicted within the interior of a simulated model of at least that portion of the body within which the body part is found, and the images are viewed by peering or otherwise looking into the simulated body interior, most preferably using an instrument or in some other manner by which a physician or medical professional will normally view or observe the body part of interest in examining a patient. The apparatus further includes a user-operable or adjustable arrangement for manual or otherwise controlled manipulation of an internally-disposed image support means so as to permit the user or observer to selectively displace or transport each of the images, one after another, into alignment or other suitable juxtaposition with an opening or passageway of the simulated model body and through which the body part images are viewable by an observer located externally of the model. That opening is preferably one that is also present in a living animal body—and through which the physician will normally observe and/or examine the live body part—but may also be an incision or cut or other simulated opening of a type that may in practice be created by a physician in a living body to provide access to the body interior and, most particularly, to the body part of interest.

While there have been shown and described and pointed out fundamental novel features of the invention as applied to several preferred embodiments thereof, it will be understood that various omissions and substitutions and changes in the form and details of the disclosed apparatus may be made by those skilled in the art without departing from the spirit of the invention. It is the intention, therefore, to be limited only as indicated by the scope of the claims appended hereto.

What is claimed is:

1. An anatomical display apparatus for use in depicting stages of treatment of a medical condition, comprising:

a topographically realistic three-dimensional shell simulating a portion of an animal body containing an interior body part of interest and having an orifice defined therein;

a display face including a cutout portion suitably configured for receiving said shell;

a self-standing frame for accommodating said display face in user-viewable supported relation on said frame; and displaying and selecting means operatively connected to said frame and including a plurality of viewable images depicting the body part of interest in a plurality of predetermined conditions for user-controlled display of a selected one of said plurality of images through said orifice defined in said shell so as to simulate an interior view of the body part in a living animal body;

wherein said frame comprises a plurality of serially and longitudinally-adjacent panels flexibly joined together along intermediate fold lines and to said display face and flexibly foldable about said fold lines to define the self-standing frame for maintaining said display face in a substantially vertical orientation atop a substantially horizontal supporting surface on which said display apparatus is supportedly disposable.

2. The anatomical display apparatus of claim 1, wherein one of said plural panels of said frame is positioned immediately adjacent a rear side of the display face when defining the self-standing frame, and said displaying and selecting means comprises a member on which said plural images are carried and pivot means connecting said member to said one panel for user-operated pivotal movement of said member relative to said one panel and to said display face so as to movingly position a selected one of said images on said member into alignment with said orifice and thereby enable viewing of said selected image through said orifice.

3. The anatomical display apparatus of claim 2, wherein said display face further includes a notch defined along a transverse edge thereof and wherein said displaying and selecting means member is shaped and positioned so that a portion of said member is graspable at said notch for user-operated pivotal movement of said member.

4. The anatomical display apparatus of claim 3, wherein said displaying and selecting means member comprises a substantially flat disk.

5. The anatomical display apparatus of claim 2, wherein said one panel is connected to said one end of said display face, and wherein a second of said plural panels is connected to an opposite end of said display face for supported abutment with a substantially horizontal supporting surface on which said display apparatus is supportedly disposable.

6. The anatomical display apparatus of claim 5, wherein said one panel includes a slot defined therein, and wherein a third of said plural panels is connected along one of said intermediate fold lines to said second panel and carries a projection for releasable engagement with said one panel slot to define said self-standing frame.

7. The anatomical display apparatus of claim 5, wherein each of said first and second panels are integrally and flexibly joined to said display face along a respective one of said intermediate fold lines.

8. The anatomical display apparatus of claim 2, wherein said one panel is integrally and flexibly joined to said display face along one of said intermediate fold lines.

* * * * *